US007336051B2

(12) United States Patent
Cecconi

(10) Patent No.: US 7,336,051 B2
(45) Date of Patent: Feb. 26, 2008

(54) VOLTMETER RELAY WITH BUILT-IN TERMINAL BOARD

(75) Inventor: Pietro Cecconi, Monza (IT)

(73) Assignee: Electrica S.R.L., Milan (IT)

( * ) Notice: Subject to any disclaimer, the term of this patent is extended or adjusted under 35 U.S.C. 154(b) by 0 days.

(21) Appl. No.: 11/580,873

(22) Filed: Oct. 16, 2006

(65) Prior Publication Data

US 2007/0111611 A1 May 17, 2007

(30) Foreign Application Priority Data

Nov. 15, 2005 (IT) ......................... PC20050033 U

(51) Int. Cl.
*H02P 1/24* (2006.01)

(52) U.S. Cl. ....................................... 318/727; 439/709

(58) Field of Classification Search ................ 318/727; 438/709

See application file for complete search history.

(56) References Cited

U.S. PATENT DOCUMENTS 1,800,394 A * 4/1931 Lunsford .................... 320/162
2006/0202657 A1* 9/2006 Cecconi ...................... 318/727
2006/0202786 A1* 9/2006 Cecconi ...................... 335/128

* cited by examiner

*Primary Examiner*—Gary Paumen
(74) *Attorney, Agent, or Firm*—Young & Thompson

(57) ABSTRACT

A voltmeter relay, of the type normally installed in control boxes for the electric motors of refrigerator compressors, equipped with a built-in terminal board for connection of the relay excitation coil to the electric motor, the pickup and maintenance capacitors, the thermostat and any other utilities. In practice, a terminal board is built into the relay, whereas according to the prior art, it is separate from the relay and therefore requires additional connections. The voltmeter relay is of the type used in association with one or more capacitors, designed to start and power single-phase induction motors, the voltmeter relay being connected to the induction motor, the capacitors and one or more utilities, and includes a built-in terminal board (3) including all the terminals required to make the connections.

4 Claims, 4 Drawing Sheets

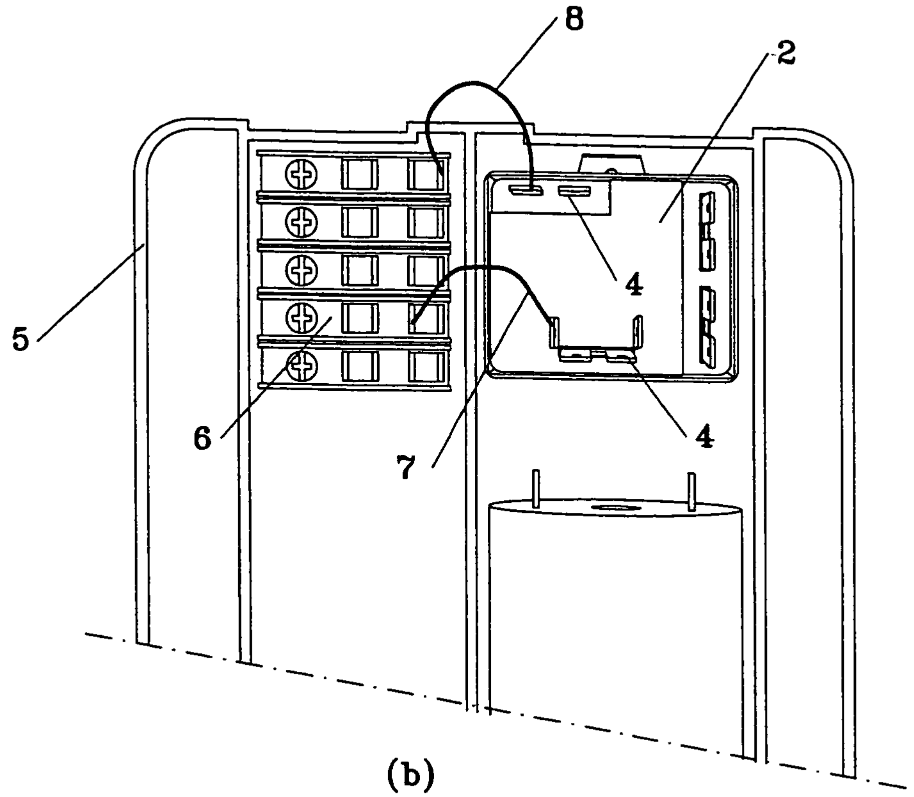
(b)
Fig. 1
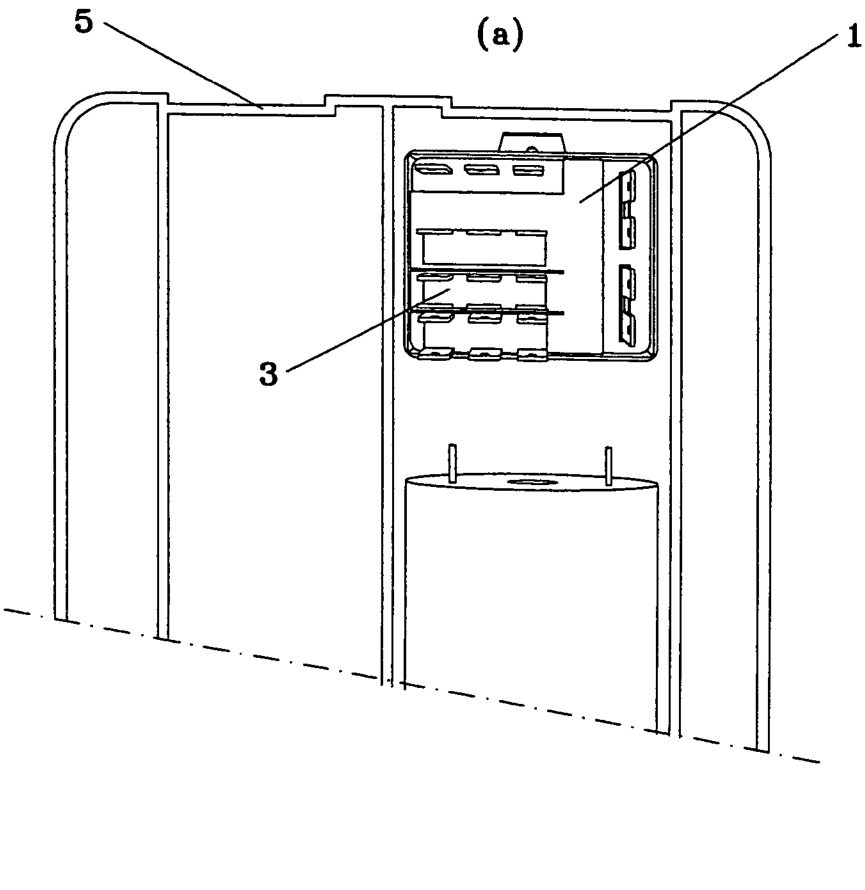
(a)

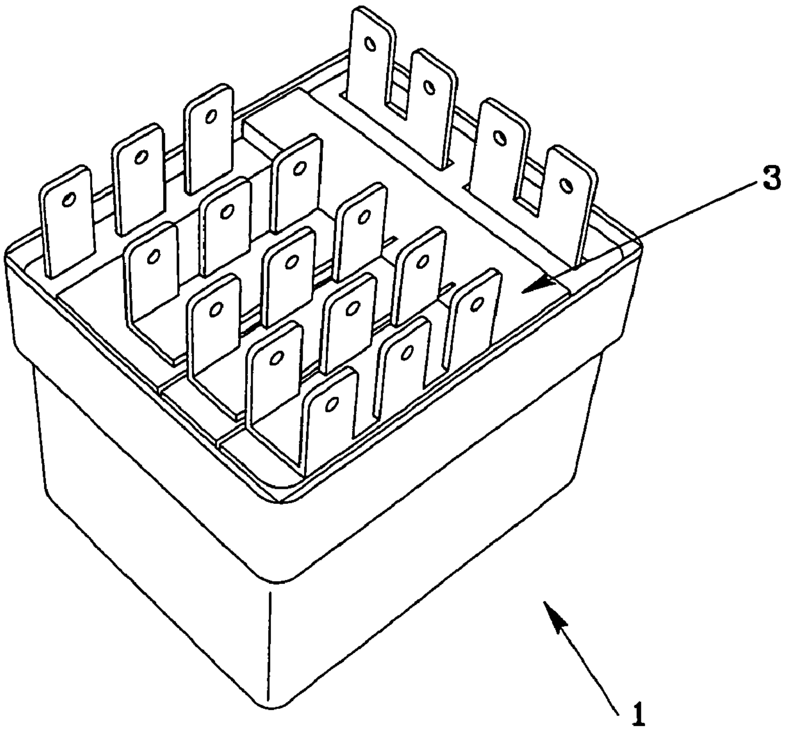
Fig. 8
Fig. 9
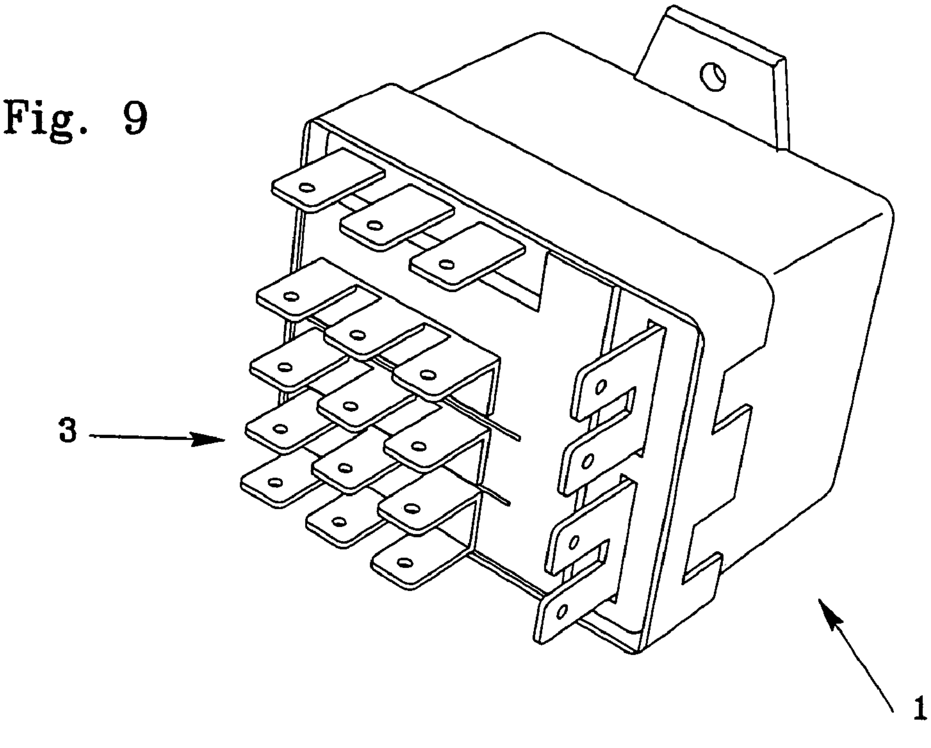

VOLTMETER RELAY WITH BUILT-IN TERMINAL BOARD

This invention relates to a voltmeter relay, of the type normally installed in control boxes for the electric motors of refrigerator compressors, equipped with a built-in terminal board for connection of the relay excitation coil to the electric motor, the pickup and maintenance capacitors, the thermostat and any other utilities.

In practice, a terminal board is built into the relay, whereas according to the prior art, it is separate from the relay and therefore requires additional connections.

The result is a particular configuration of parts which considerably increases the practicality of the device, and provides significant savings in terms of cost, installation time and space occupied.

Voltmeter relays are used to control the operation of single-phase induction motors. Said relays, associated with a start capacitor and a maintenance capacitor, supply the pick-up current required to start the motor, and when the motor reaches the required rpm, interrupt the pick-up current so that the motor only receives the current required to drive it.

For example, a refrigerator, the temperature of which must be kept constant, is fitted with a thermostat which, when associated with said voltmeter relay, starts the compressor whenever the temperature detected by said thermostat increases by a given amount above a set value, and switches it off whenever the temperature falls below said set value by a given amount.

Voltmeter relays are usually fitted inside a "control box", which is not usually in contact with the motor or the compressor, but separate from them, although the distance may only be a few centimetres, said box being connected to the motor with a cable.

According to the prior art, the box incorporates said starting and maintenance capacitors, a terminal board and the voltmeter relay.

The box can also be fitted with cable glands in accordance with European standards, which require cables to be tug-proof.

The power cables, the connector cable to the refrigerator control thermostat and the cable that connects it to the motor all lead to the box.

The capacitors can be connected directly to the relay, or to the terminal board, depending on the diagram; in any event, two more cables are needed to connect the relay to the terminal board.

An arrangement like the one described means that the control box contains said terminal board in addition to the voltmeter relay and capacitors, which causes some problems.

Firstly, having a separate terminal board means that the system takes up more space.

Secondly, in addition to the connections between the terminal board and the cables leading from the exterior, connections need to be made from the terminal board to the relay, thus increasing the risk of incorrect connections.

The drawbacks described are eliminated by the present invention, which relates to a voltmeter relay as claimed in claim 1, with built-in terminal board, said relay being installed in a control box, which need not be in contact with the motor or the compressor, but may be separate from them, wherein all the connections are made directly to the terminal board of the relay, thus eliminating the need to connect the voltmeter relay to an external terminal board.

In other words, this invention eliminates the terminal board external to the relay and the two cables connecting it to the relay, replacing them both with a relay with built-in terminal board.

The advantages of using a voltmeter relay according to the invention are financial, because a relay with built-in terminal board costs much less than a separate relay and terminal board, and saves space which could be used to instal other devices in the box; alternatively, a smaller box, which is easier to position and cheaper, could be used.

Moreover, as fewer connections need to be made, incorrect connections are less likely.

The invention will now be described according to a preferred embodiment, by way of example but not of limitation, with reference to the annexed figures, wherein:

FIGS. 1(*a, b*) show a control box with a relay according to the invention, compared with a relay according to the prior art;

FIGS. 8 and 9 show the relay according to two perspective views from different points.

Figure 2:
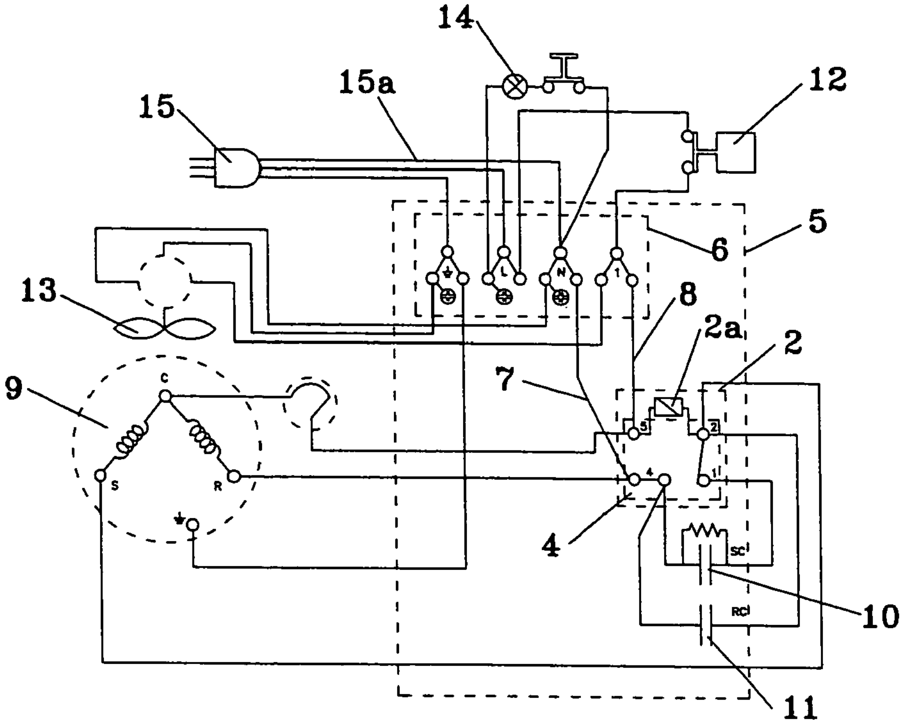
FIG. 2 shows a circuit wherein a voltmeter relay according to the prior art is used.

No. (1) in FIG. 1*a* indicates a relay according to the invention, while (2) in FIG. 1*b* indicates a relay according to the prior art.

Both comprise a base 20 which, together with a lid 21, forms a box element that encloses a coil, contacts and everything else required.

These components are connected to a set of faston contacts positioned on the bottom wall of base 20.

The difference between the two relays is the presence of a terminal board (3) on relay (1) according to the invention, which has a considerably larger number of faston terminals than terminal board (4) of relay (2) according to the prior art.

Said relays (1) and (2) are inserted in a box (5). Moreover, in the solution of known type, there is also a terminal board (6) external to relay (2), to which said relay (2) is connected with two wires (7) and (8).

Figure 3:
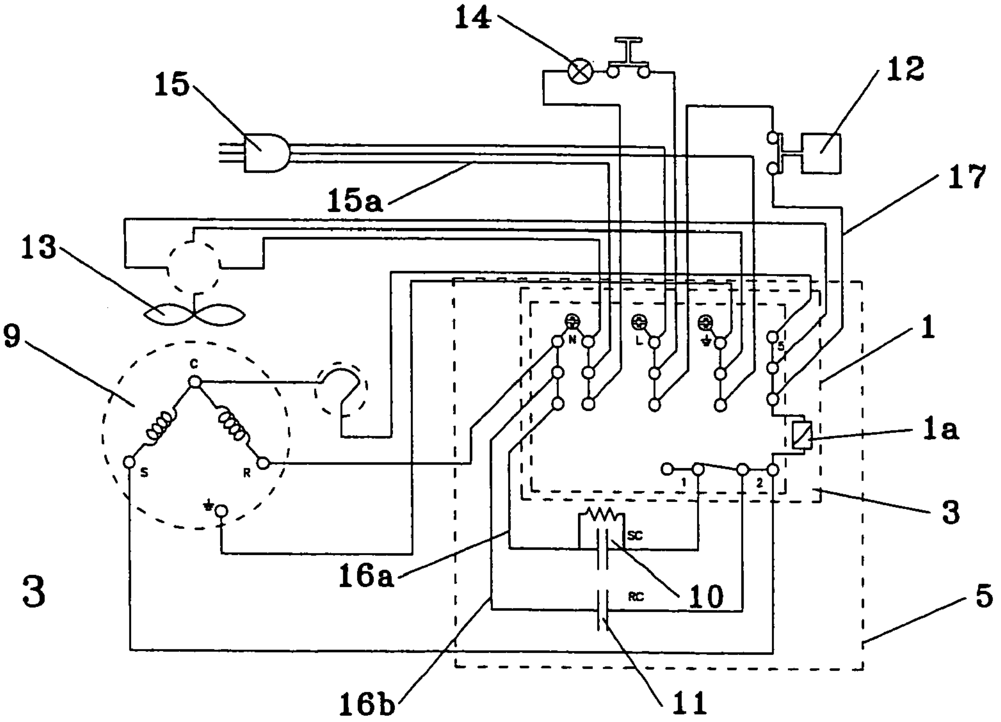
FIG. 3 shows a circuit wherein a voltmeter relay according to the invention is used.
Figure 6:
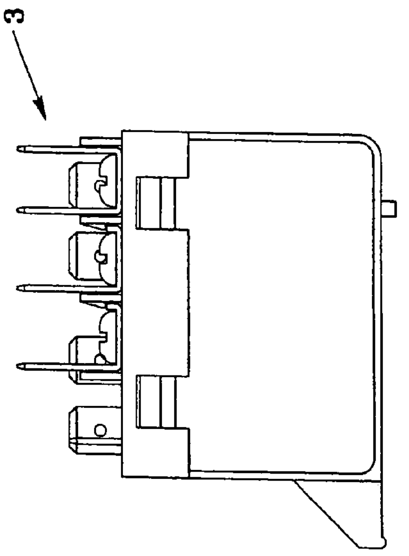
FIGS. 4 to 7 are views of the relay according to the invention.
Figure 7:
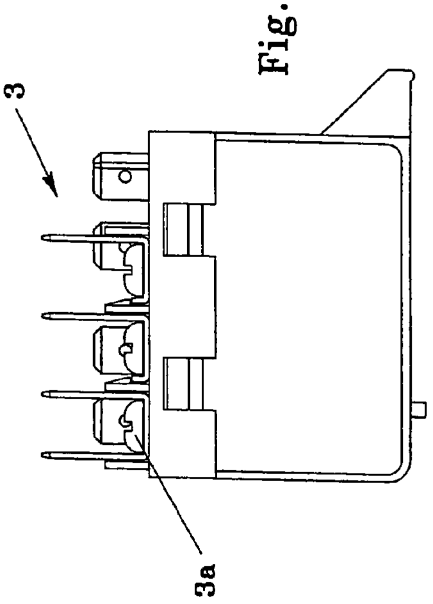
Figure 4:
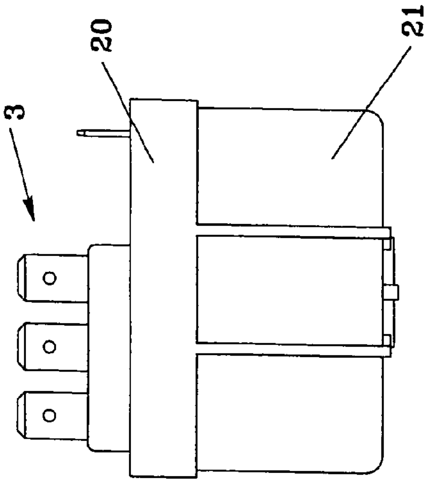
Figure 5:
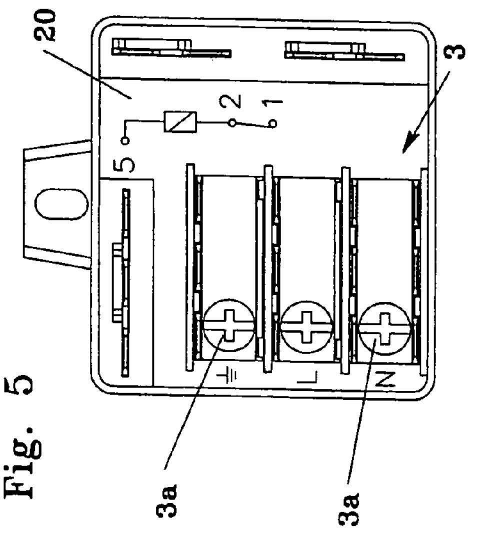

There are obviously other differences too, namely the internal electrical connections as shown in FIGS. 2 and 3; in practice they perform the function of said two wires (7), which are absent in the solution according to the invention.

Moreover, terminal board (3) of relay (1) according to the invention includes screws (3*a*), which conform to European standards, to allow wiring with electrical wires not fitted with faston terminals.

FIG. 2 shows a circuit in which a voltmeter relay (2) according to the prior art, with coil (2*a*), is used. Said circuit includes, for example, a motor (9) for the compressor of a refrigerator, said relay of known type (2) with its terminal board (4), said terminal board external to said relay (2), a starting capacitor (10) and a maintenance capacitor (11).

Relay (2), external terminal board (6) and capacitors (10) and (11) are contained in said box (5), called the control box.

Relay (2) is connected via its terminal board (4) to motor (9) and capacitors (10) and (11), while a thermostat (12) which detects the temperature of the cold chamber, a fan (13) that cools motor (5), and possibly other utilities (14), such as a lamp, are connected to terminal board (6), again in the case of control of a refrigerator unit.

Electrical power supply (15) also obviously reaches terminal board (6). The connections between terminal board (6)

and the utilities, and between relay (2), motor (9) and capacitors (10) and (11) are known in themselves, and will not be further described.

However, said two connections (7) and (8), made with two electrical wires applied in situ by the installation personnel, are present between terminal board (4) and relay (2), as shown in FIG. 1*b*.

FIG. 3 shows a circuit in which said voltmeter relay (1) according to the invention, with coil (1*a*), is used. In this case said terminal board (3), present on relay (1) according to the invention, is the only terminal board in the circuit.

If a relay (1) according to the invention is used, there is no need to instal electrical wires (7) and (8), merely to make the normal connections to motor (9), thermostat (12), fan (13), lamp (14) and power line (15).

When the connections have been made as shown in FIGS. 2 and 3, it will be seen that said connections (7) and (8) in FIG. 1*a* correspond to equivalent connections in the version shown in FIG. 1*b*.

As shown in FIG. 2, connection (7) allows power supply (15) to reach the two capacitors (10) and (11) via branches (15*a*) and (7), while connection (8) places relay (2) in direct communication with thermostat (12).

As shown in FIG. 3, power supply (15) reaches capacitor (10) via branches (15*a*) and (16*a*), and capacitor (11) via branches (13*a*) and (16*b*), whereas the connection between thermostat (12) and relay (1) is provided by branch (17). All the other connections obviously remain unchanged.

As indicated in the above description, the use of relay (1) according to the invention clearly offers significant advantages in terms of practicality, because it is sufficient to make a connection with a single terminal board, and said connection could be made en bloc if all the terminals are combined in a single connector, without subsequent electrical connections.

The advantages mentioned above, namely that a terminal board external to the relay is no longer used, and the components take up less space, are obviously maintained.

The invention has been described by way of example but not of limitation, according to a preferred form of embodiment.

One skilled in the art could devise numerous other embodiments, all of which fall into the ambit of protection of the following claims.

The invention claimed is:

1. Voltmeter relay of the type used in association with one or more capacitors, designed to start and power single-phase induction motors, said voltmeter relay being connected to said induction motor, said capacitors and one or more utilities, characterised in that said voltmeter relay includes a built-in terminal board (3) comprising all the terminals required to make said connections.

2. Voltmeter relay as claimed in claim 1, characterised in that said terminal board (3) is fitted on the outer wall of the base.

3. Voltmeter relay as claimed in claim 1, characterised in that said terminal board (3) contains terminals suitable for faston connectors.

4. Voltmeter relay as claimed in claim 1, characterised in that said terminal board (3) includes screw terminals (3*a*).

* * * * *